Dec. 21, 1948.  C. G. WHITNEY  2,457,020
PLAYING CARDS

Filed Aug. 23, 1946  3 Sheets-Sheet 1

INVENTOR
Clarence G. Whitney
BY
ATTORNEY

Dec. 21, 1948.　　　　C. G. WHITNEY　　　　2,457,020
PLAYING CARDS

Filed Aug. 23, 1946　　　　　　　　　　　　3 Sheets-Sheet 2

INVENTOR
CLARENCE G. WHITNEY
BY
ATTORNEY

Dec. 21, 1948.  C. G. WHITNEY  2,457,020
PLAYING CARDS
Filed Aug. 23, 1946  3 Sheets-Sheet 3
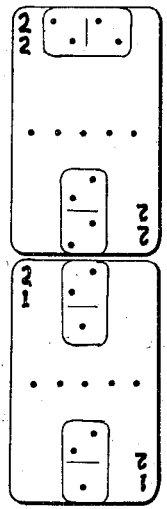
Fig. 10
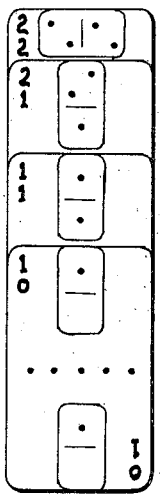
Fig. 11
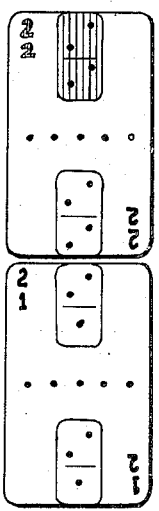
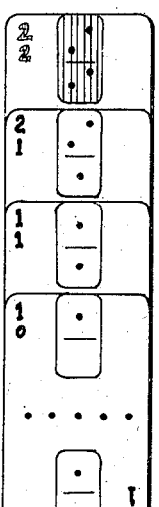
Fig. 14
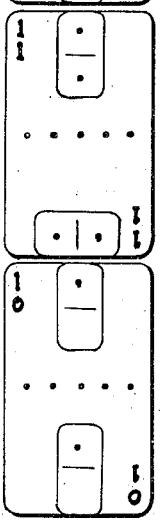
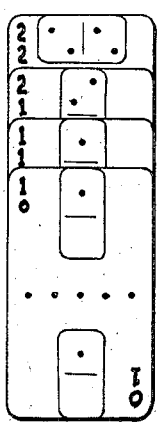
Fig. 12
Fig. 13
Fig. 15
*INVENTOR.*
Clarence G. Whitney
BY
Leonard L. Kalish Patented Dec. 21, 1948

2,457,020

UNITED STATES PATENT OFFICE 2,457,020

PLAYING CARDS

Clarence G. Whitney, Camden, N. J.

Application August 23, 1946, Serial No. 692,587

3 Claims. (Cl. 273—152)

This invention relates to playing cards, each having representations, simulations or replicas of a domino on it, arranged so that all of the games of dominoes can be played with these cards.

One object of this invention is to provide a deck of cards, of standard playing-card size, with which all of the games of dominoes may be played, with all the plays showing, but nevertheless, requiring the same or less space as is required to play the same games using domino blocks.

Another object is to provide a deck of cards for playing the above games in a "blind" fashion in which only the last-played domino cards, in any line, the starting double-domino card and any double-domino cards played later, crosswise, or only the last cards played, are visible.

Yet another object is to provide a deck of cards that may be used for playing a large variety of games.

Still further objects of this invention are to provide a deck of cards which has the advantages, as compared to dominoes in block form, of convenience, because the cards can be stacked or stored in a small space, can be handled, dealt, and shuffled more conveniently than domino blocks, and in which the surplus or "bone pile" takes up less space and is fair to all the players because the individual dominoes cannot be recognized.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the drawings:

Figures 10, 11 and 12 show three ways that four cards of the type shown in Figures 1 and 2 could be matched in a game of dominoes each taking up less room than the other.

Figure 1:
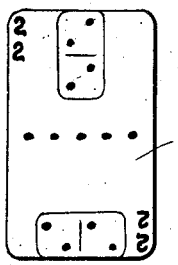
Figure 1 represents a face or plan view of a playing card having two representations of a domino thereon; the representations being the same in numerical value but being distinguishable one from the other by difference in position.
Figure 2:
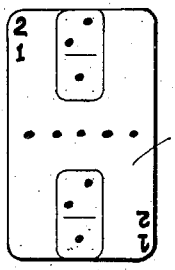
Figures 2 and 2a represent face or plan views of two playing cards having two representations of a domino having an unequal number of dots or other designating marks on each end of the domino. They differ only in the arrangement of the corner numerals.
Figure 1A:
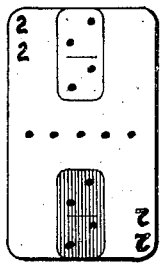
Figure 1a represents a face or plan view of a playing card having two representations of a domino having an equal number of dots or other designating marks on each end of the domino, the two representations being made distinguishable one from the other by difference in color.
Figure 2A:
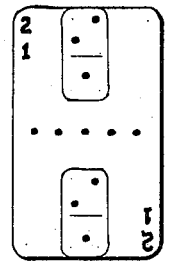
Figure 3:
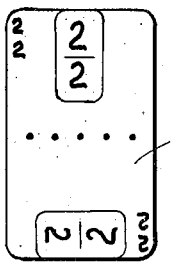
Figure 3 represents a face or plan view of a modified form of playing card similar to that shown in Figure 1 but having numerals on the representations of the domino instead of dots.
Figure 4:
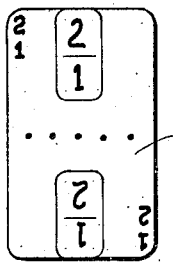
Figure 4 represents a face or plan view of a modified form of playing card similar to that shown in Figure 2, but having numerals on the representations of the domino instead of dots.
Figure 3A:
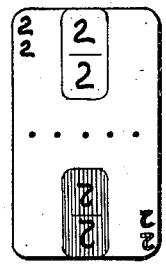
Figure 3a represents a face or plan view of a modified form of playing card similar to that shown in Figure 1a, but having numerals on the representations of the domino instead of dots or other designating marks.
Figure 4A:
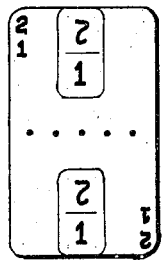
Figure 4a represents a face or plan view of a modified form of a playing card similar to that shown in Figure 4, but showing a change in the arrangement of the corner numerals and those on the domino replicas.
Figure 5:
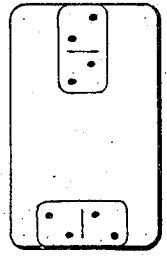
Figure 5 represents a face or plan view of another form of playing card like that of Figure 1 but without the corner markings.
Figure 6:
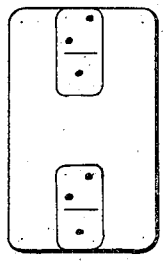
Figure 6 represents a face or plan view of a playing card like that of Figure 2 but without the corner markings.
Figure 5A:
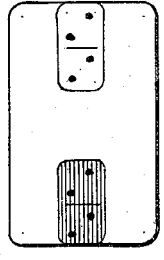
Figure 5a represents a face or plan view of a playing card like that shown of Figure 1a but without the corner markings.

Figures 13, 14 and 15 show cards of the same value as those in Figures 10, 11 and 12, but of the type shown in Figures 1a and 2 played in the same manner.

The well-known games of domino are regularly played with sets of blocks which vary in numbers. The most common number of blocks per set is 28 or 55. The set of 28 blocks is composed of a block for each of the possible combinations of the numerals 0 through 6, taken two at a time, plus 7 double blocks on which each of the seven numerals appear at each end of a block. The set of 55 blocks is composed in like manner except that the ten numerals 0 through 9 are used.

The present invention contemplates the provision of domino-like representations on playing-cards, whereby all of the conventional domino games can be played and whereby, in addition, new games (not capable of being played with conventional dominoes) are possible, by virtue of the novel disposition of the domino representations upon the cards.

Thus, for example, the present invention contemplates the provision of two domino representations, one at each end of the card. The present invention further contemplates the arrangement of the two domino representations on "double-domino" cards whereby the representations can be distinguished. For example, one of the representations on "double-domino" card can be distinguished from the other by difference in color or by difference in position or, by difference in size or shape, or by a combination of any of these means.

Figure 8:
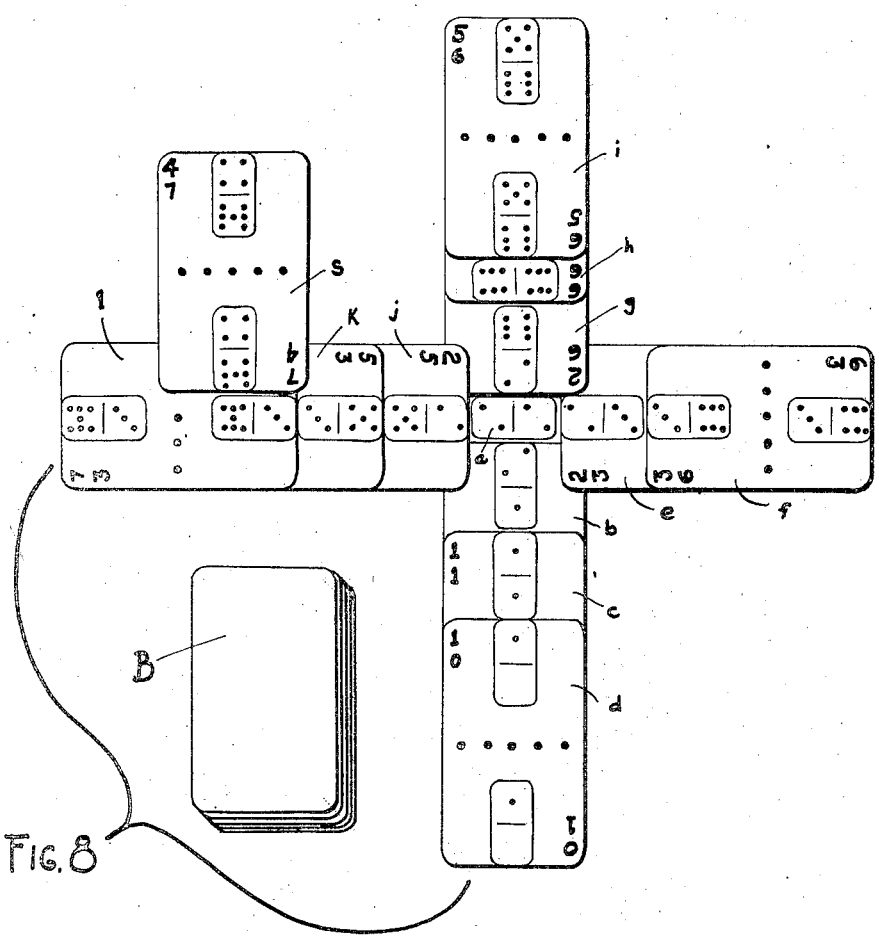
Figure 8 represents a top plan view of a plurality of cards as arranged on a table or the like while a game is being played, with the surplus pack or "bone pile" in perspective.

Referring to Figure 8, it is evident that all plays that can be made with domino blocks can be made with domino cards. Card "c" could have been played crosswise, see Figure 1. Card "h" could have been played endwise. Card "s" could have been played horizontal or vertically down.

The actual play is always inside the dotted lines. If cards are played so that they cover the dotted line on the card beneath or part of the line, as in a turn, the card will have been played correctly. This makes a very simple way to instruct new players. After playing a short while with this type card, one automatically disregards anything outside the dotted line. The lines are an optical control which works without being obvious.

Had double cards of the type shown in Figure 1a been used, there would have been no change in rules. Where a double was played crosswise, the red end of the card would have been played. Where a double was played endwise, the black end of the card would have been played.

It is obvious, when the small space taken up by the card bone pile is considered, that the cards require less space than blocks.

Any of the various types of cards shown in the drawings could be played in the manner shown in Figure 8.

In playing dominoes in "blind" fashion all the rules for scoring remain unchanged. The "blind" type of game would be difficult if not impossible to play with domino blocks. In order to play the "blind" type of game efficiently, a player must remember all the cards that have been played.

The cards shown in Figure 8 could have been played in a "blind" fashion which takes up still less space. If played in the "blind" fashion, each card which is played is covered by the succeeding card so that the only cards exposed are the last cards played in any line and the starting double domino card. For example, referring to Figure 8, cards "a" and "b," "e," "g" and "j" are played as shown leaving card "a" still showing. All the other cards would have been played by first holding the cards in relation to the card underneath as shown in Figure 8 so that all players may see that the match was correctly made then, secondly, the card would be moved up until it completely covered the card beneath. Had the cards in Figure 8 been played "blind," the only cards showing would be cards "a," "d," "f," "i" and "s."

The game of sequence dominoes is played thus:

Three cards are placed on the table to start the game. These cards may be, by way of illustration, the cards "six and three," "five and four" and "five and five" shown in Figure 9.

Three cards are dealt to each player, these cards constituting the player's hand. The rest of the cards are dealt to the several players evenly, face down, for each individual player's "bone pile." Any extra cards are left out of the play.

Figure 9:
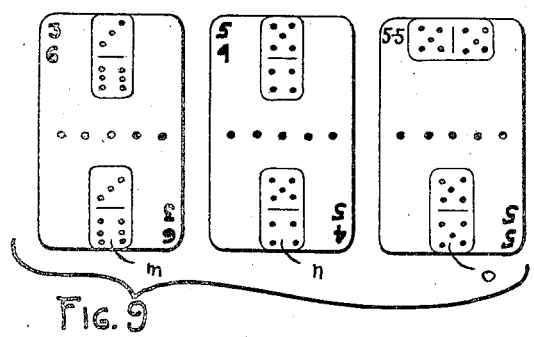
Figure 9 represents a face or plan view of three cards forming the starting cards for a game of sequence.
Figure 7:
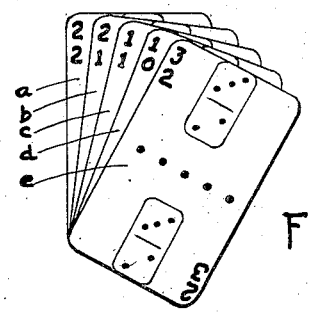
Figure 7 represents a face or plan view of a number of cards as they appear when held in a player's hand.

The dealer indicates the scoring numbers of the cards, as for example, the "6" (m), "4" (n) and "5" (o) at the lower ends of the cards in Figure 9. These numbers are also the numbers to be matched.

The player to the left of the dealer can play on any one of the cards as described in connection with the game of "blind" dominoes explained above with one exception, i. e., in this game, all cards played on are completely covered by the cards played on them.

The players play in rotation clockwise; the object of the game being to dispose of all the cards and make winning combinations during the play as will be described herein below.

For scoring and matching, consider only the end of the replica that appears marked m, n or o.

If, after a card has been played, the three scoring numbers are the same, the player scores points corresponding to the number. That is, if the player by playing his card can cause the scoring numbers to be all "4," he scores four points.

If, by playing his card, the player can arrange the three scoring numbers as a sequence (as, for example, "6-4-5" or "5-6-4" or "5-4-6" or "4-6-5" though not in ascending or descending order, he scores points corresponding to the highest number (in this case six points).

If the three scoring numbers form a sequence in ascending or descending order (as, for example, "4-5-6" or "6-5-4") the player scores double the highest number (in this case twelve points).

Each time a player plays a card, he picks up one from his "bone pile." If a player cannot play (because none of his cards match), he passes. If all players pass, they can simultaneously pick up a card from their individual "bone piles" until someone can play; the first to pass having the right to play first. After extra cards have thus been picked up, no more are picked up until this is necessary to again give the player three cards in his hand after playing (unless, again, all players have passed). The player whose individual "bone pile" is first exhausted is the winner and score 5 points for winning plus one point for each card left in each opponents "bone pile."

Another game, called "Poke-Dom," can be played using the same rules as for the game of sequence dominoes just described, except that six cards are laid out at the start and players select the five cards that give the best poker combination. A player's cards must be one of the essential cards. Various values may be determined for the various poker hands. In order to win, a player must also play the three cards in his hand.

If the cards containing only the values 1 through 6 are used the deck would be composed of twenty-one cards. The combinations of dots found on these twenty-one cards would be representative of the various combinations possible with a pair of dice. If we consider the two ends of the card as two separate combinations by calling first the number of dots that is outermost, then we would have thirty-six combinations that could represent the combinations of values found on a pair of dice that were of different color or size so that arbitrarily one color or size would be called the first number of the pair.

Several games combining dice and cards can be played with this deck.

As used in the appended claims, the term "domino replicas" or the like is intended to comprehend replicas wherein the values are indicated by arabic numbers or any other equivalents of the conventional domino "dots."

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A deck of playing cards corresponding to a set of dominoes, each card bearing a pair of replicas of a single domino, said replicas being disposed adjacent the ends of the cards, the replicas of different-half dominoes being arranged so that opposite halves are outermost at the ends of each card, the replicas of double-dominoes being distinguished one from the other on each double-domino card.

2. A deck of playing cards coresponding to a set of dominoes, each card bearing a pair of replicas of a single domino, said replicas being disposed adjacent the ends of the cards, the replicas of different-half dominoes being arranged so that opposite halves are outermost at the ends of each card, the replicas of double-dominoes being distinguished one from the other on each double-domino card, each card bearing a transverse mark separating the domino replicas.

3. A deck of playing cards corresponding to a set of dominoes, each card bearing a pair of replicas of a single domino, said replicas being disposed adjacent the ends of the cards, and the replicas of different-half dominoes being arranged so that opposite halves are outermost at the ends of each card.

CLARENCE G. WHITNEY.

REFERENCES CITED

The following references are of record in the file of this patent:

UNITED STATES PATENTS

| Number | Name | Date |
|---|---|---|
| 712,566 | Moller | Nov. 4, 1902 |

FOREIGN PATENTS

| Number | Country | Date |
|---|---|---|
| 519,336 | Great Britain | Mar. 21, 1940 |